Dec. 19, 1933.   F. J. LAPOINTE   1,939,820
BROACH
Filed May 21, 1932
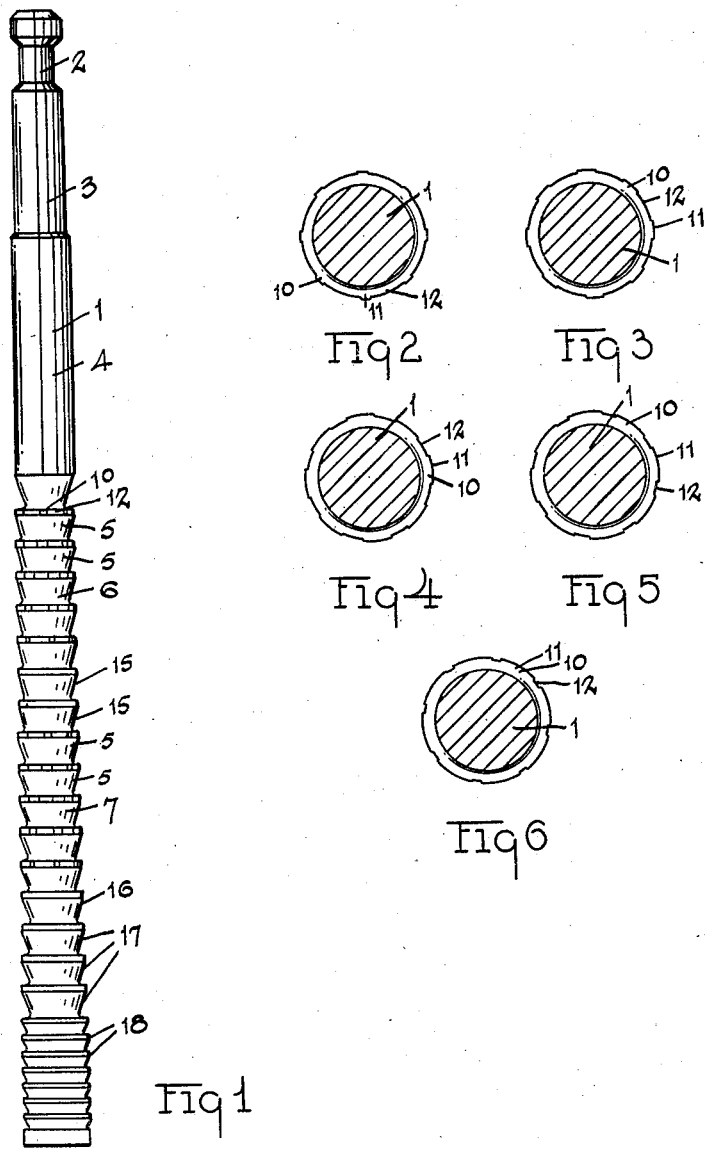

UNITED STATES PATENT OFFICE 1,939,820

BROACH

Francis J. Lapointe, Ann Arbor, Mich.

Application May 21, 1932. Serial No. 612,662

6 Claims. (Cl. 90—33)

My invention has for its object to provide an efficient broaching tool that is provided with a plurality of teeth, each tooth adapted to cut only on one or more relatively narrow points or projections and succeeding teeth increasing progressively the width of the cut, while maintaining its depth until the full width of the cut is produced. Thus, by my invention I provide a plurality of cutting projections formed on the teeth of a broach, the cutting projections having cutting edges located at a desired distance from the surface of the body of the teeth and the projections progressively widening the cut on one or both sides of the cutting projections whereby a narrow and deep cut may be produced by the first cutting projection and progressively widened by the succeeding projections. Also, preferably, the portions of the teeth located on opposite sides of the cutting projections operate to maintain registration and axial alignment to insure substantially perfect cylindricity where cylindrical holes are to be formed or perfect lateral planes where channels or slots are to be cut.

When applied to pull broaches the invention thus provides a pull broach that will make a deeper cut per length of broach, may be moved at a greater rate and is given a greater life in doing the same class of work as the ordinary pull broach. This is accomplished by making a deep first cut and then widening the cut progressively by each succeeding cutting projection, each succeeding cutting projection adding its quota to its cutting width or to its cutting width and depth and at the same time making clean the cut of the preceding tooth by re-cutting or finishing the surface previously cut and, if desired, repeating the cutting operation.

The broach may also be provided with the usual pilot and finishing teeth in the manner well known in the art, and the invention may be used in slot forming broaches and in push broaches as well as in pull broaches.

The invention thus enables the use of a pull broach half as long, that may be operated in half the time and accomplish the same results as the ordinary pull broach. Thus, a broach twenty-four inches in length, including the pilot, machine connecting part, and finishing or burnishing ridges may be used with the same efficiency as a broach forty-eight inches in length. As for example, a broach for cutting a hole having a five inch depth, such as a five inch bushing, requires a forty-eight to fifty inch ordinary pull broach having a cutting length of forty or forty-five inches for broaching what is known as hard metals. While broaches embodying my invention having a cutting length of seventeen inches will accomplish the same result. The invention greatly reduces time for grinding or sharpening the broach. By reason of the cut being made by cutting projections it reduces not only the time for the grinding, but also reduces the number of times that the broach has to be ground during its life. It also enables a more accurate grinding, since the parts to be ground are located only on the ends of the small projections. Also, in view of the fact that portions of the body of the teeth on opposite sides of the cutting projections afford a centralizing guide for the cutting edges of the projections, drifting, and sidewise or sinuous movement of the broach through the opening cut by the broach is prevented.

Also, inasmuch as the cutting is done by the projections of a plurality of teeth, each projection of each set cutting to the same depth and each suceeding tooth progressively widening, injury to any tooth on the broach does not affect the operation of the broach, since the failure of a tooth is corrected by a succeeding tooth. Also, in view of the fact that by my invention the cutting section of the ordinary pull broach may be reduced to one-third, a greater production is accomplished in view of the fact that a shorter stroke of the machine may be used. Inasmuch as there is about one-third of the number of teeth to be ground, there is a great saving in grinding, and also in view of the fact that the broach is so much shorter, the broach will not spring as much as the longer broach and trouble from springing during the grinding is practically eliminated. Also, in view of the fact that each projection cuts well below the skin or crust of the surface of the work, the teeth do not have to be ground so frequently as the teeth of a long broach where each tooth scrapes "fuzz" from the surface of the work. In broaches embodying my invention, the cut is well below the skin or crust of the surface instead of a scraping operation of the surface as in the case of the ordinary pull broaches. This eliminates the inaccuracies due to the spring of the metal of the work and also reduces the sinuous movement of the broach, particularly through the harder metals and eliminates lateral deflection or spring where one of the teeth is injured or becomes duller on one side. The broach embodying my invention also consumes less power to operate since the friction of scraping is entirely eliminated. The broach cuts progressively exceedingly narrow channels that are progressively widened, while in sustaining the depth of the cut until the full width of cut is produced with the result that the friction load is reduced about forty percent.

The invention consists in other features and advantages which will appear from the following description and upon examination of the drawing. Broaches containing the invention may partake of different forms and may be varied in their details and still embody the invention. To illustrate a practical application of the invention I have selected a pull broach embodying the invention as an example of the various pull and push broach for forming or cutting holes or slots of different shapes, and the details of such broaches that contain the invention and shall describe the selected broach hereinafter, it being understood that variations may be made and that certain features of my invention may be used to advantage without a corresponding use of other features of the invention and without departing from the spirit of the invention. The particular broach selected is shown in the accompanying drawing.

Fig. 1 of the drawing illustrates a side view of a pull broach having a plurality of sets of teeth and containing my invention. Figs. 2, 3, 4, 5 and 6 illustrate certain of the teeth of the broach illustrated in Fig. 1. Fig. 2 illustrates a section of the broach taken on the plane slightly in advance of the first tooth of one of the sets. Fig. 3 illustrates a similar view with reference to the second tooth. Fig. 4 illustrates a similar view with reference to the third tooth. Fig. 5 illustrates the same with reference to the fourth tooth. Fig. 6 is a similar view with reference to the fifth tooth of the set.

The broach 1 illustrated in the figures, is provided with the usual head 2 formed to connect the broach in the drawhead of a broaching machine. It also has the usual shank 3 and a pilot 4.

The broach is provided with a plurality of teeth having cutting edges. The teeth are divided into a plurality of sets 6 and 7. The teeth 5 of two of the sets have cutting projections 10 that progressively increase in width from the advancing to the following end of the broach when operatively used in the machine. In the particular form of construction shown in the drawing the cutting edges 11 of the projections 10 are located in circles having the same diameter and extending along arcs of different lengths about the axis of the broach. The edges 11 of each projection having a portion located in a line extending parallel to the axis of the broach. Preferably, the projections 10 are so located in each set that they move over the same area that is described by the movement of the preceding teeth and in addition cut a portion of the metal that was left by the preceding teeth. Thus, the cutting projections 10 may be so located that the centers of their cutting edges may be located in a line parallel to the axis, the major diameter of each of the teeth being the same, or the ends of the cutting edges of the projections may be located in a line parallel to the axis, the major diameter of each of the teeth being the same, or the ends of the cutting edges of the projections may be located in a line parallel to the axis of the broach. In the first form of construction, the ends of the cutting edges will be located in a helical line, while in the second form of arrangement, one end of each of the cutting edges will be located in a straight line parallel to the axis of the broach and one end of each cutting edge will be located in a helical line. In the particular broach shown the cutting projections are arranged as described above as the second form of arrangement. For cutting slots, the ends of the cutting edges are located in lines inclined to each other. While various arrangements of the teeth may be provided, yet preferably, the lower teeth pass over the same area of the work that has been passed over by the preceding teeth.

The teeth are so formed as to leave surfaces at the sides of the teeth that form guiding surfaces that prevent drifting and consequently prevent sinuous movement of the work with respect to the broach or of the broach with respect to the work. The cutting projections protrude from the face of the teeth to a relatively considerable extent in order to make a deep cut as compared to ordinary pull broaches. The cutting projections project sufficiently to cut well within the hard skin of the metal that is produced by boring or otherwise cutting or working on the metal in forming the hole. Where a casting is operated upon the chilling at the surface is rapid, which produces a crust-like formation or crystallization at the surface. The projections of the first set of teeth 5 cut well into the metal and to a depth that is below the skin or crust of the metal formed either by working or by casting. The following set of cutting teeth 5 likewise have projections that extend below the skin formed by the cutting operation of the preceding set and they likewise extend to a considerable depth. Thus, the cutting operation of the broach avoids the scraping operation of the ordinary broach wherein each tooth is constantly working against the hardened skin formed on the metal by the preceding teeth and increasing the thickness of the skin or maintaining its thickness. Usually the skin depth is produced by the outward pressure caused by three or four of the preceding teeth in the ordinary pull broach. Thus, each tooth of the ordinary pull broach is constantly working against the hardness created in the metal by the operation of four or five of the preceding teeth, while in broaches embodying my invention the teeth project beneath the hardened skin thus formed and cut the softer metal, the skin being broken at the base of the cutting projections, which greatly reduces the power consumed in enlarging a hole to a definite size and a definite length.

The width of the cutting projections 10 increases progressively in the teeth having the projections until the spaces between the projections are substantially equal to the width of the projections of the first tooth. The teeth 5 are then followed by one or more teeth having edges that form complete circles, such as the teeth 15. The cutting edges of the teeth 15 have the same diameter as the circle in which the cutting edges of the teeth 5 are located. The succeeding set of teeth and the circles of the cutting edges of the projections have a diameter much greater than the diameter of the teeth of the preceding set. The cutting projections have an increased width, that is, they describe increasingly greater arcs of the circle about the axis, their major diameter remaining the same. The last of the set are separated by spaces that are substantially equal to the width of the cutting projections of the first of the set. The cutting projections have ends located in a line parallel to the axis of the broach and in a helical line. The teeth of the set having the cutting projections are also preferably followed by one or more teeth 16 having a cutting edge that describes a complete circle and may substantially be followed by a set having a still larger diameter, such as the teeth 17, which however, in each case, have a cutting edge that describes a complete circle. These may be followed by finishing ridges having cylindrical surfaces 18 of the type well known for burnishing and smoothing purposes.

The pilot 4 may be formed to have a diameter substantially the same as that of the hole with sufficient clearance for free movement of the broach and yet to prevent material lateral play. The diameter of the portions of the teeth 5 of the first set between the cutting portions is preferably substantially the same as the diameter of the pilot though it may be slightly larger, but yet a diameter that will cause the cylindrical surfaces 12 to snugly fit the hole and thus provide a plurality of close piloting areas that maintain the cutting edges in position and prevent lateral displacement and consequent spring of the broach and also prevent lateral displacement of the bushing and thus insure true cylindricity of the hole. The following set of teeth have, preferably, portions between the cutting projections that have a diameter substantially the same as the circles of the cutting edges of the projections of the preceding set, there being however, sufficient tool clearance to allow movement without any burnishing effect and to locate the surfaces of the said portions of the teeth in contact with the surface of the work to insure the same piloting action to prevent sinuous movement of the broach through the hole or local deviation of the work and thus insure true cylindrical formation.

I claim:

1. A broach having a plurality of sets of teeth, the teeth of each set having cutting projections progressively increasing in width, portions of the cutting edges of the projections of each set located in a line parallel to the major axis of the broach, the teeth of the sets progressively extending further from the major axis of the broach and the portions of the teeth of each set located on opposite sides of the projections extending from the major axis of the broach substantially the same distance as the cutting edges of the preceding set of teeth for piloting the broach.

2. A broach having a guiding pilot and a plurality of sets of teeth, the teeth of each set having cutting projections progressively increasing in width, the portions of the cutting edges of the projections of each set located in a line parallel to the major axis of the broach, the teeth of the sets progressively extending further from the axis of the broach, the portions of the teeth located on the sides of the projections extending from the major axis of the broach substantially the same distance that the cutting edges of the projections of the preceding set extend, the portions of the teeth of the first set located at the sides of the cutting projections extending from the major axis of the broach substantially the same distance that the surface of the pilot is located from the major axis of the broach.

3. A broach having a plurality of teeth, the teeth having a plurality of projections, each tooth having the same number of projections, the projections having arcuate cutting edges, each cutting edge of the projections progressively increasing in length, portions of the cutting edges of the teeth located on a line parallel to the major axis of the broach.

4. A broach having a plurality of teeth, the teeth having a plurality of projections, each tooth having the same number of projections, the projections having arcuate cutting edges, each cutting edge of the projections progressively increasing in length, the same amount, portions of the cutting edges of the teeth located on a line parallel to the major axis of the broach.

5. A broach having a plurality of teeth, the teeth having a plurality of projections, the projections having arcuate cutting edges, the cutting edges of the projections progressively increasing in length by substantial equal amounts until the cutting edge of the last tooth describes a complete circle, the centers of the cutting edges of consecutive teeth, except the last tooth, located in a line parallel to the major axis of the broach.

6. A broach having a plurality of sets of teeth, the teeth of each set having a plurality of projections, the projections having arcuate cutting edges, the cutting edges of the projections increasing in length by substantially the same amount, the centers of the cutting edges of consecutive teeth of each set located in a line parallel to the major axis of the broach, the projections of the teeth of the following sets progressively extending further from the axis of the broach and the portions of the teeth of following sets located on opposite sides of the projections extending from the major axis of the broach substantially the same distance as the cutting edges of the preceding set of teeth for piloting the broach.

FRANCIS J. LAPOINTE.